Aug. 19, 1969     L. T. RAMAIKA     3,461,498
PRESSURE INJECTION APPARATUS
Filed Nov. 30, 1966
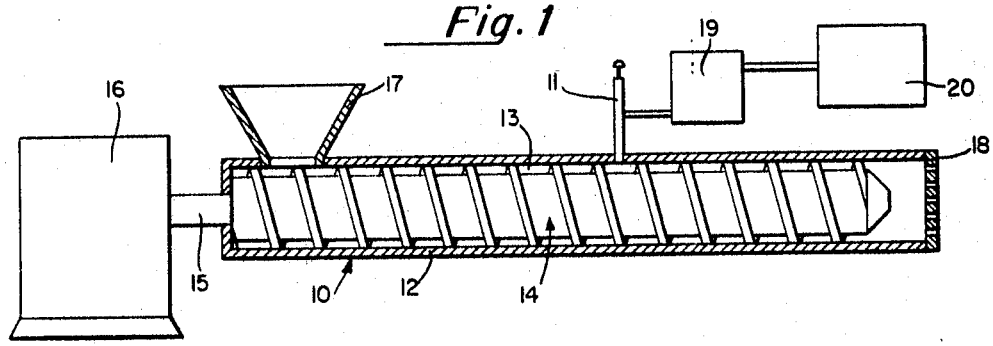
Fig. 1
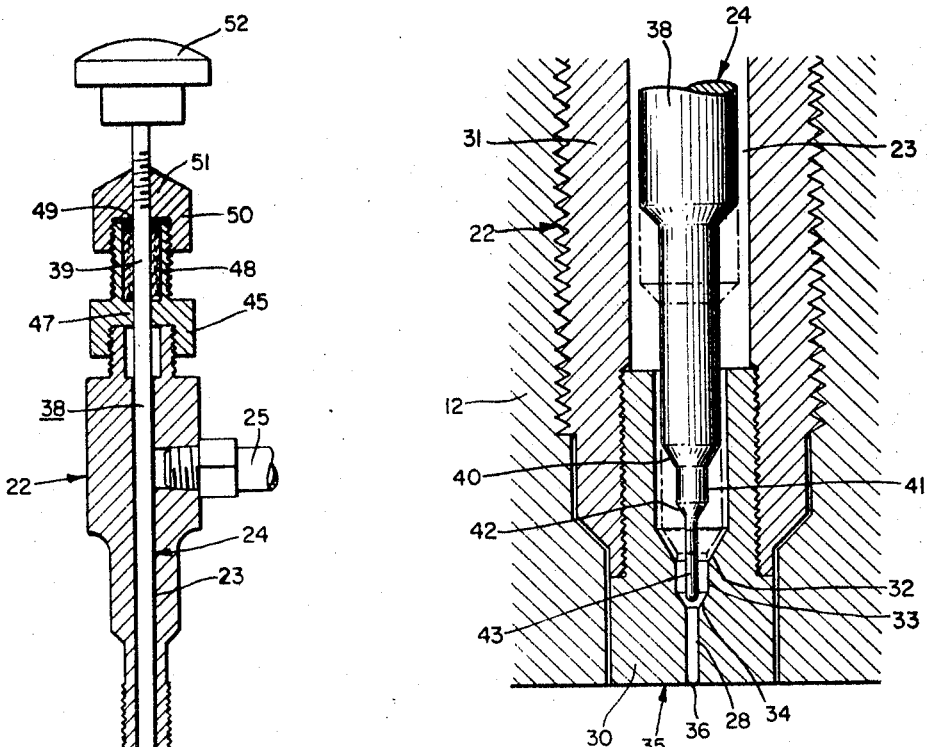
Fig. 3
Fig. 2
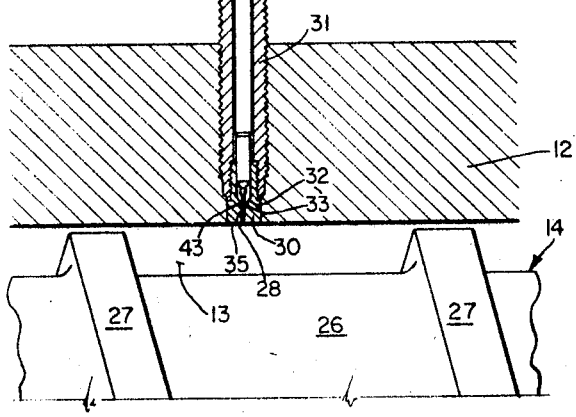
INVENTOR.
LAWRENCE T. RAMAIKA
BY
ATTORNEY.

United States Patent Office 3,461,498
Patented Aug. 19, 1969

3,461,498
PRESSURE INJECTION APPARATUS
Lawrence T. Ramaika, Media, Pa., assignor to Scott Paper Company, Delaware County, Pa., a corporation of Pennsylvania
Filed Nov. 30, 1966, Ser. No. 597,912
Int. Cl. B29f 3/02, 3/04
U.S. Cl. 18—12           7 Claims

ABSTRACT OF THE DISCLOSURE

Pressure injection apparatus having a narrowed throat portion connecting a source of additive material under pressure to a pressure chamber the greatest dimension of the cross-section of which throat portion is between about 0.01 inch and about 0.02 inch whereby plugging of the apparatus is eliminated.

BACKGROUND OF THE INVENTION

Field of the invention

This invention relates to pressure injection apparatus and, more particularly, to apparatus for introducing materials into a chamber containing a thermoplastic resin under pressure.

In the preparation of thermoplastic resins to enable them to be fabricated into a desired form, other materials are often admixed with the thermoplastic resin. Typical materials which are compounded with the thermoplastic resin are foaming agents, plasticizers, pigments, antioxidants, and flame-retarding agents. Some of these materials may be combined chemically or, more rarely, physically with the particulate thermoplastic resin material prior to feeding such material into an extruder for processing. However, the cost of combining these materials in a form which remains stable until ultimately processed in an extruder and which satisfactorily functions in an extruder is much higher than the cost of combining these additive materials directly with partially extruded thermoplastic resin material at an intermediate point during an extrusion process.

Description of the prior art

In spite of the above situation, the insertion of materials into a chamber containing thermoplastic resin under pressure, such as into the barrel of an extruder at a point intermediate the feed end and the outlet end, has been found difficult in the past. One problem experienced has been plugging of the opening in the extruder barrel wall through which the material is inserted into the extrusion chamber. The pressures generated within the extruder chamber during melting and mixing are quite high, up to about 5,000 p.s.i. and even higher. The thermoplastic resin under pressure in the extruder often advances into the opening or orifice of a duct through the extruder barrel wall through which material is inserted. It generally solidifies and thereafter prevents further insertion of any additive materials into the extruder barrel through the orifice for admixture with the thermoplastic resin. Elaborate devices have been developed to prevent this plugging and to clear the orifice after it has once become plugged. None of these schemes has been entirely successful and disassembly of the extruder or the pressure injection apparatus generally has been necessary with the accompanying costly machine down time and loss of production as well as the waste of improperly processed material. In spite of the best efforts, some improperly processed material is bound to become incorporated in products, which will ultimately be defective to some degree.

Attempts have been made to introduce materials into an extruder in low pressure regions along the extruder barrel such as in a venting section of the extruder. However, some types of material are extruded without a low pressure region or venting section in the extruder since they do not generate gases during extrusion and so do not require venting. In addition, it is difficult to maintain within an extruder a genuinely low pressure region and plugging is a problem even in these areas with conventional material injection apparatus.

SUMMARY OF THE INVENTION

The above-mentioned difficulties and shortcomings are overcome by pressure injection apparatus of the invention by means of which material may be introduced into a pressure chamber containing thermoplastic resin under pressure, such as an extruder barrel. Insertion may be accomplished through a wall of the chamber at any point regardless of internal pressures involved in the chamber. In addition, the pressure injection apparatus of the invention substantially reduces or eliminates plugging of the inlet orifice by preventing the entrance and solidification of extruded material. The apparatus of the invention may be employed to insert additive materials into an extruder, which are in the form of a gas, a liquid, or a particulate solid.

It is a principal object and advantage of this invention to provide improved apparatus for introducing materials into a chamber containing thermoplastic resin under pressure.

It is a further object and advantage of the invention to provide apparatus for reducing or eliminating plugging of an inlet orifice leading from a source of additive material into a pressure chamber.

It is a still further object and advantage of the invention to provide pressure injection apparatus including means for preventing plugging of a material feed duct during extruder operation when additive material under pressure is being inserted into an extruder as well as means for preventing plugging of the duct when the extruder is inoperative or when additive material under pressure is not being inserted.

The invention involves the discovery that, by inserting material under pressure into a pressure chamber through a duct within a certain critical size range, plugging by theromplastic resin is substantially reduced or eliminated. This discovery makes it possible to substantially simplify the construction and operation of pressure injection apparatus. Apparatus of the invention also enables plugging of the inlet duct or orifice to be reliably prevented when no material is to be fed therethrough. Furthermore, extrusion apparatus utilizing the pressure injection apparatus of the invention achieves higher production rates due to the reduction or elimination of costly machine down time due to plugging of the additive inlet orifice.

BRIEF DESCRIPTION OF THE DRAWINGS

Additional objects and advantages of the invention will become apparent from the following detailed description thereof, when read in conjunction with the accompanying drawings, in which:

FIGURE 1 is a diagrammatic elevation view, showing part in section, of extrusion apparatus of the invention, FIGURE 2 is an enlarged sectional elevation view of a portion of the extrusion apparatus shown in FIGURE 1, showing an assembled pressure injection apparatus of the invention, and FIGURE 3 is a greatly enlarged sectional view of a portion of the apparatus shown in FIGURE 2.

DESCRIPTION OF THE PREFERRED EMBODIMENT

Referring now to FIGURE 1, an extruder 10 is shown in combination with pressure injection apparatus 11 of the invention. The extruder 10 comprises an extruder barrel 12 which, in some instances, may consist of a number of longitudinal sections (not shown) joined together at points along the length of the barrel 12 by bolts (not shown). The extruder barrel 12 defines a melting and mixing chamber 13 along its length in which is disposed a rotatably mounted screw 14. A shaft 15 extending through one end of the extruder barrel 12 is operably connected to a motor 16 which rotatably drives the extruder screw 14. A suitable seal and bearing (not shown) are provided between the extruder barrel 12 and the screw shaft 15. In some embodiments, speed control apparatus (not shown) may be incorporated between the motor 16 and the shaft 15 of the extruder screw 14. A feed hopper 17 is mounted adjacent the driven end of the screw 14 and is arranged to feed particulate thermoplastic material into the melting and mixing chamber 13 of the extruder barrel 12. Material is propelled along the barrel 12 upon rotation of the extruder screw 14 and mixed and melted by the heat and pressure generated by the action of the extruder screw 14 within the chamber 13. A breaker plate 18 is normally arranged across the discharge end of the extruder barrel 12. Breaker plate 18 generally constricts the flow of the material through the extruder 10, thereby creating considerable additional back pressure within the chamber 13. Breaker plate 18 also breaks up the flow pattern of the extruded material, and mixes and diffuses the extrudate.

With different types of material and with different extruder screw designs and depending upon a large number of other variables, sometimes there are preferable positions along the extruder barrel 12 for introducing materials to be admixed with the thermoplastic resin in chamber 13. However, it has been found that the pressure injection apparatus 11 of the invention may be satisfactorily employed to insert material at any point along the extruder barrel 12 wherever desired by a particular process or use. In the extrusion apparatus shown in FIGURE 1 of the drawings, pressure injection apparatus of the invention is located at a point approximately midway between the feed hopper 17 and the discharge orifice of the extruder barrel 12. A pump 19 is shown connecting a source or supply 20 of material to be added to the thermoplastic resin with the pressure injection apparatus 11. Such material may be of the nature described above.

FIGURES 2 and 3 illustrate in greater detail a specific embodiment of pressure injection apparatus 11 of the invention. The apparatus 11 includes a nozzle body 22 having a passageway 23 in which is disposed an elongate valve member 24. The diameter of the valve member 24 is less than the diameter of the passageway 23 so that an annular passageway is preserved which permits the flow of additive material through the nozzle body 22. A feed duct 25 is provided through which predetermined amounts of material, received from the source 20 shown in FIGURE 1, under pressure from the pump 19 shown in FIGURE 1, are introduced into the passageway 23. The passageway 23 in the nozzle body 22 connects the feed duct 25 with the chamber 13 of the extruder 10 which, during operation, normally contains thermoplastic resin under pressure.

A portion of the extruder screw 14 is shown adjacent the extruder barrel wall 12 in FIGURE 2. The screw has a spiral groove 26 formed by a spiral ridge or land portion 27. The land portion 27 passes in close proximity to the surface of the extruder barrel wall 12.

An important feature of the invention is the provision for a narrowed throat portion 28 in the end of the passageway 23 adjacent the chamber 13. That is, it has been found that this narrowed throat portion 28 should preferably have a cross-section the greatest dimension of which falls within a critical dimensional range to substantially reduce or eliminate plugging of the passageway 23 by thermoplastic resin under pressure within the extruder chamber 13. A circular cross-section has been found to be the one most conveniently and accurately formed, at is can be easily done by boring to close tolerance with little or no machining.

The nozzle body 22 consists of a nozzle 30 and a nozzle holder 31. The nozzle 30 is threadedly attached to one end of the nozzle holder 31. The nozzle holder 31 is threadedly inserted into an opening through an extruder barrel wall 12 so that the nozzle 30 is adjacent the chamber 13. The cylindrical passageway 23 defined by the nozzle holder 31 extends into the nozzle 30. The walls of nozzle 30 taper inwardly to form an outer valve seat 32. A second cylindrical section 33 connects the outer valve seat 32 to a second inwardly tapered portion forming the inner valve seat 34. Inner valve seat 34 connects to a third cylindrical section defining a narrowed throat portion 28 terminating at the face 35 of the nozzle 30 in an orifice 36.

Thus, the walls of the nozzle 30 define a nozzle duct generally tapering inwardly from a large diameter cylindrical passageway 23 to a narrowed throat portion or passageway 28. In accordance with the invention, narrowed throat portion 28 has a generally circular cross-section and a diameter within a critical range of between about 0.01 inch and about 0.02 inch. The reasons for the selection of this critical range will be presented subsequently.

The valve member 24 has an elongate stem 38 extending along the length of the nozzle holder 31 and includes a through-extending portion 39 extending beyond the end of the nozzle holder 31 most remote from the chamber 13. The end of the valve member 24 nearest the chamber 13 includes an inwardly tapered section forming a first frusto-conical face 40, a cylindrical section 41, another inwardly tapered section forming a second frusto-conical face 42, and a cylindrical pin 43. In FIGURES 2 and 3, the valve member 24 is shown in open position by solid line and in closed position by dotted line.

The diameter of the cylindrical pin 43 is approximately the same as the diameter of the narrowed throat portion 28 of the nozzle duct or passageway 23. A close fit is achieved by machining it to close tolerance with the narrowed throat portion 28. The second frusto-conical face 42 is tapered to form a seal or closure with the inner valve seat 34 when the valve member 24 is in its closed position. In this position, the inner end of the cylindrical pin 43 representing the end of the valve member 24 is preferably substantially flush and even with the face 35 of the nozzle 30.

A seal housing 45 having a peripheral cap 46 is threadedly attached to the end of the nozzle holder 31 most remote from the chamber 13. Housing 45 has a radially inwardly depending flange 47 machined to close tolerance with the through-extending portion 39 of the valve stem 38. The flange 47 and housing 45 contain packing 48 which may be of the type of fibrous absorbent material containing a lubricant and used in seals. For applications involving high pressures within chamber 13, a packing 48 formed of Teflon has been found to be preferable since it allows high compressive forces to be placed on the seal while still allowing easy turning of the valve stem 38. A washer 49 is disposed about the stem 38 above the packing 48. The packing 48 is compressed by pressure of a cap 50 threadedly mounted on the upper end of the housing 45 and pressing on the washer 49. The cap 50 has a radially inwardly depending flange 51 containing threads which engage corresponding threads on a portion of the stem 38. Thus, rotation of the stem 38 causes axial movement of the valve member 24 along the passageway 23. A knob 52 is attached to the upper end of the stem 38 to enable a user to conveniently close and open the closure formed by the second frusto-conical valve face 42 acting on the inner valve seat 34 by axially moving the valve member 24.

Pressure injection apparatus constructed generally as described above was successfully employed for injecting Freon, pentane and trichloroethylene into a thermoplastic resin under pressure in an extruder barrel. In several of these instances, a polystyrene foam was prepared and extruded with a resulting density of from about 20 to about 40 pounds per cubic foot. The material added to the thermoplastic resin was a blowing or foaming agent. It was fed to the pressure injection apparatus by a pump at a pressure slightly higher than the pressure on the thermoplastic resin contained within the extrusion chamber.

Several different pumps have been employed with the above apparatus and it is believed that any commercial positive displacement pump will work satisfactorily. One pump employed with the apparatus was a diaphragm pump manufactured by the Hills-McCanna Company, 400 Maple Ave., Carpentersville, Ill. The Hills-McCanna pump was driven at approximately 900 strokes per minute. In this manner, the additive material was injected into the melted thermoplastic resin in rapidly pulsating surges closely approximating a continuous flow. The effect of this action was diffusion of the additive material into the melted resin at a substantially precisely measured amount. A manual stroke adjustment device on this pump provided precise control of the quantity of the additive material metered into the extruder barrel. An adjustable spring loaded discharge valve allowed a selection of pump discharge pressures.

Another pump employed with the apparatus was a double piston pump manufactured by the American Instrument Company, 8030 Georgia Ave., Silver Spring, Md.

In operation of the apparatus of the invention, the stem 39 is axially moved in a direction more remote from the chamber 13 by rotation of the stem within the threaded flange 51 of cap 50. This withdraws cylindrical pin 43 from within narrowed throat portion 28 and opens the closure formed by first frusto-conical face 42 against inner valve seat 34 thereby allowing passage of material from pump 19 through feed duct 25 and through passageway 23. The pressure of the material within passageway 23 is maintained by pump 19 higher than the pressure of the thermoplastic resin in chamber 13, thereby insuring that blockage of orifice 36 and narrowed throat portion 28 is prevented. It has been found by experience, that when the narrowed throat portion has a cross-sectional dimension greater than 0.02 inch, thermoplastic resin more or less periodically will flow from chamber 13 into narrowed throat portion 28 even though the pressure of material within passageway 23 is greater than the pressure of the thermoplastic resin in chamber 13. However, when this cross-section was reduced so that the greatest dimension was less than 0.02 inch, substantially no plugging occurred. Therefore, apparatus according to the invention preferably has a narrowed throat portion with a cross-section having its largest dimension or diameter equal to less than 0.02 inch.

Should failure of the pump 19 occur prior to reduction of the pressure of thermoplastic resin within chamber 13, some material may advance into narrowed throat portion 28 through orifice 36. To provide for this circumstance, it has been found necessary to provide a cylindrical pin 43 of sufficient diameter and strength to pierce narrowed throat portion 28 so as to remove any solidified thermoplastic material positioned therein. It has been found that to provide sufficient strength for this function, the diameter of cylindrical pin 43 should be equal to or greater than 0.01 inch. Another function is served by cylindrical pin 43 when the extruder is to be shut down or when no material is to be added to the thermoplastic resin in the extruder. In the above instances, stem 38 is axially moved toward chamber 13 so that cylindrical pin 43 forms a complete closure with narrowed throat portion 28 whereupon no blockage of the throat portion 28 or orifice 36 can occur.

From the above description it is apparent that the present invention provides a new and improved pressure injection apparatus which overcomes many of the problems and difficulties of the prior art. Furthermore, the apparatus of the invention is greatly simplified in construction from that previously employed.

It is apparent from the above description of the invention that various modifications in the apparatus described may be made within the scope of the invention. More than one pressure injection apparatus may be employed along or peripherally about the extruder barrel. In addition, although the chamber of an extruder barrel has been described, the chamber into which material is inserted by the invention could be any other type of pressure chamber containing a flowable material under pressure. Therefore, the invention is not intended to be limited to the specific apparatus described in detail above.

What is claimed is:

1. In pressure injection apparatus for introducing material into a chamber containing thermoplastic resin under pressure, wherein said apparatus includes means defining a duct through which material passes into said chamber, the improvement comprising means defining a narrowed throat portion of said duct connecting said duct with said chamber, said throat portion having a cross-section, the greatest dimension of which is between about 0.01 inch and about 0.02 inch.

2. The improvement in pressure injection apparatus according to claim 1, wherein said chamber is the space defined by an extruder barrel wall.

3. The improvement in pressure injection apparatus according to claim 1, wherein said apparatus included an axially movable valve pin adapted for selected insertion into the narrowed throat portion of said duct when no material is to be introduced into said chamber, said valve pin substantially filling said narrowed throat portion and arranged to prevent the flow of thermoplastic resin under pressure into said duct.

4. Pressure injection apparatus for introducing material into a chamber, said chamber being defined by wall means and containing a thermoplastic resin under pressure, said apparatus comprising:

a nozzle body having a passageway therethrough, said nozzle body being secured to and extending through said wall means so that said passageway opens into said chamber, said passageway having a narrowed throat portion connecting it with said chamber, said narrowed throat portion having a cross-section, the greatest dimension of which is between about 0.01 inch and 0.02 inch, an elongate valve member axially disposed within said nozzle body along said passageway, said valve member being arranged for reciprocal axial movement within said passageway, the end of said valve member closest to said chamber having an ejector section of smaller cross-section and adapted to form a seal with the narrowed throat portion of said passageway upon selective axial movement of said valve member toward said chamber, and pressure feeding means for introducing predetermined amounts of material under pressure into said passageway.

5. Pressure injection apparatus according to claim 4, wherein said wall means comprise the barrel of a rotary screw extruder.

6. Pressure injection apparatus according to claim 4, wherein said nozzle body includes an annular valve seat adjacent said narrowed throat portion and said valve member includes an annular bearing surface adjacent said ejector section which is adapted to cooperatively engage said valve seat to form a closure in said passageway upon selective axial movement of said valve member toward said chamber.

7. Pressure injection apparatus according to claim 4, wherein said valve member has a through-extending portion at its end most remote from said chamber extending beyond the end of said nozzle body, and sealing means are provided between said through-extending portion and said passageway to prevent leakage of said material therefrom under pressure, whereby the axial position of said valve member can be selectively controlled.

References Cited

UNITED STATES PATENTS 2,863,649   12/1958   Grubb et al.
3,199,147   8/1965   Aykanian et al.

WILBUR L. McBAY, Primary Examiner

U.S. Cl. X.R.

18—30